Nov. 18, 1930.   B. P. JOYCE   1,781,926
PACKING
Filed July 16, 1927   2 Sheets-Sheet 1

INVENTOR
Bryan P. Joyce

Nov. 18, 1930.  B. P. JOYCE  1,781,926
PACKING
Filed July 16, 1927  2 Sheets-Sheet 2
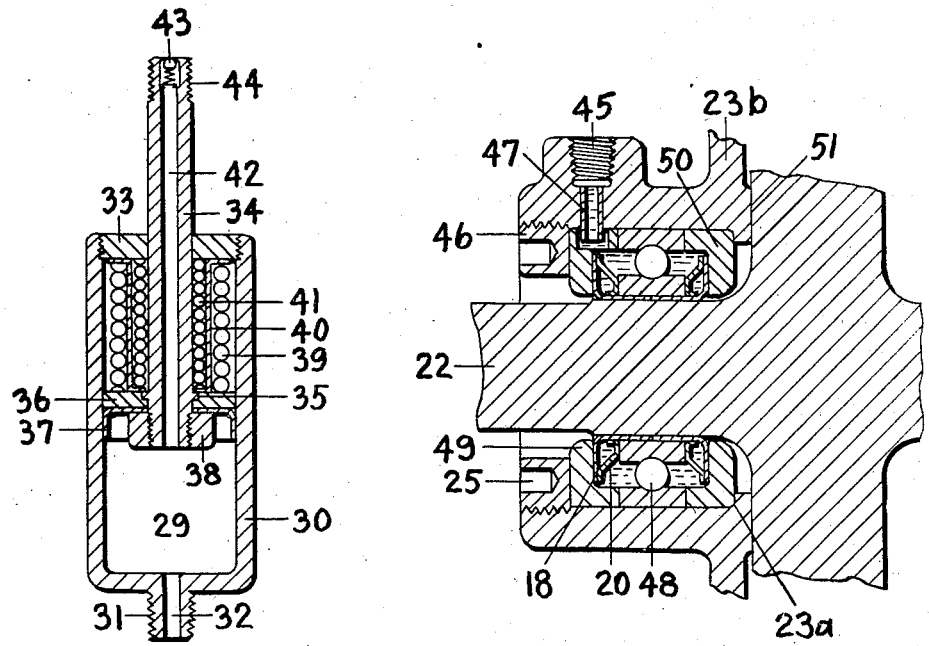
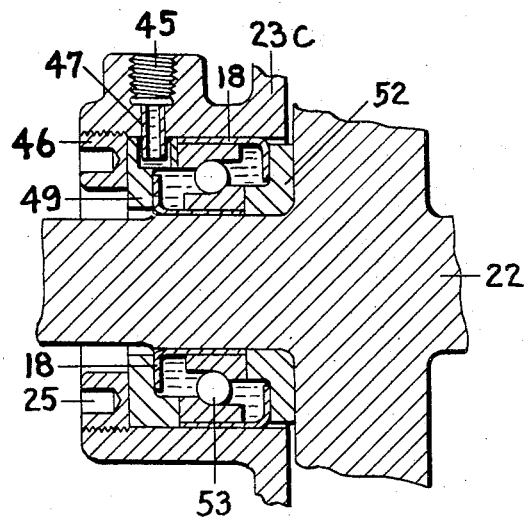
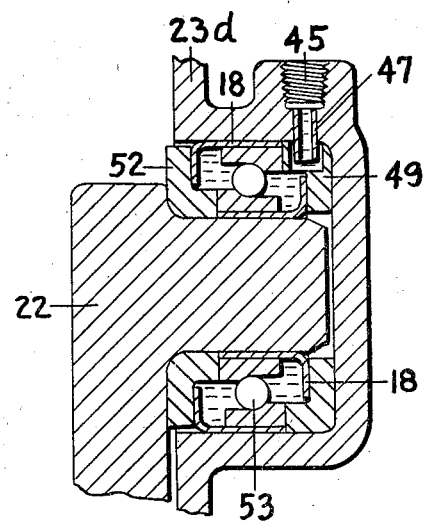
INVENTOR
Bryan P. Joyce Patented Nov. 18, 1930

1,781,926

UNITED STATES PATENT OFFICE

BRYAN P. JOYCE, OF DAVENPORT, IOWA

PACKING

Application filed July 16, 1927. Serial No. 206,210.

My invention has reference, in general, to packings, and more particularly it relates to a packing for use with rotating members.

The principal object of my invention is to provide a simple, compact and effective packing for rotating parts. Among the further objects of my invention are: to provide a packing for bearings such that the lubricant of the packing will lubricate the bearing; to provide a protective packing for bearings in pumps, compressors and other machines containing a fluid injurious to the bearings; to provide a packing for bearings which will prevent entry of dust, grit, and the like, into the bearings; to provide a packing which will tend to reduce surface inequality of the relatively movable member in contact with the packing member, also reducing friction and conserving power, the packing member serving as a polishing means for the other member; to provide a packing which will function efficiently notwithstanding eccentric movement of the rotor due to such causes as bearing clearance, deflection, etc.; to provide an efficient packing, devoid of rubber, leather and similar packing materials which might be injured by the lubricant or the fluids in the machine or which might injure parts of the machine; and such further objects, advantages and capabilities as will hereafter appear and as are inherent in the construction disclosed herein. My invention further resides in the combination, construction and arrangement of parts illustrated in the accompanying drawings, and, while I have disclosed therein what is now considered the preferred form of this invention and a modification thereof, I desire it understood that the present disclosure is to be considered as illustrative only and not as limiting my invention.

Figure 1:
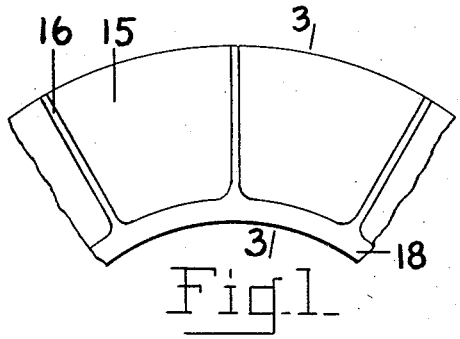
Figure 2:
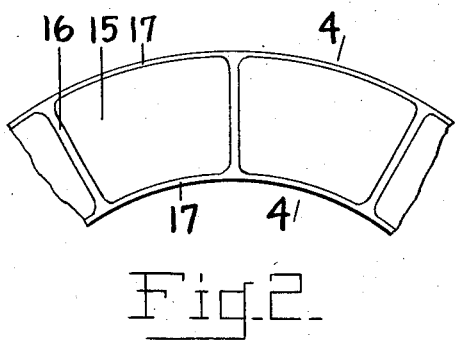
Figure 3:
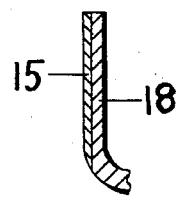
Figure 4:
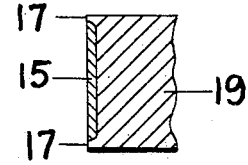
Figure 5:
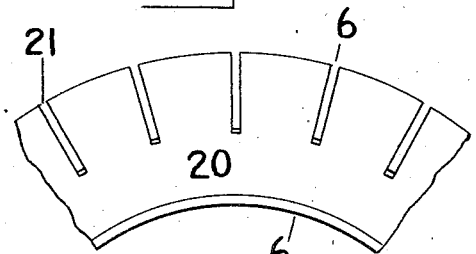
Figure 6:
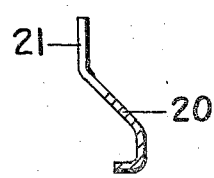
Figure 7:
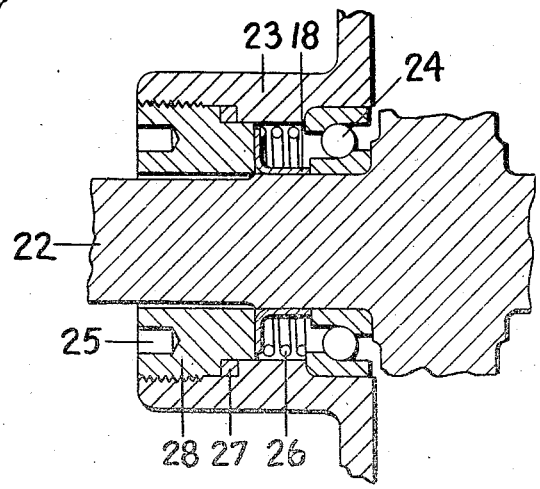

In the drawings annexed hereto and forming a part hereof, Fig. 1 shows an enlarged face view of a part of the friction surface of a packing ring; Fig. 2 shows a similar view of another form of embodiment of the invention; Fig. 3 is a cross section substantially along the plane indicated by the line 3—3, Fig. 1; Fig. 4 is a cross section substantially along the plane indicated by the line 4—4, Fig. 2; Fig. 5 is an enlarged view of a part of a pressure ring used in conjunction with one or more forms of embodiment of my invention; Fig. 6 is a cross section substantially along the plane indicated by the line 6—6, Fig. 5; Fig. 7 is a cross section through the stuffing box of a centrifugal pump having an open bearing; Fig. 8 is a longitudinal section through a lubricant pressure reservoir; Fig. 9 is a cross section through the stuffing box of a centrifugal pump having an inclosed radial bearing; Fig. 10 is a cross section through the stuffing box of a centrifugal pump having an inclosed radial and thrust bearing; Fig. 11 is a cross section through a similar stuffing box used in connection with the blind bearing of the crank shaft of a refrigerating compressor.

Referring more in detail to the annexed drawings, numeral 15 designates inserts of tin or similar soft metal separated by radial ribs 16 of harder metal, formed on the contacting face of the radial flange of a packing ring 18, which ribs are provided to prevent flow of the soft metal when the surface is in frictional contact with another part. Under some conditions it is desirable to provide restraining means to prevent the soft metal from being pressed outward radially and for this purpose I provide ribs 17 which are preferably integral with the ribs 16, thereby forming complete pockets on the surface of the bearing member, in which the soft metal is retained. Since the tin is very soft and malleable it has a tendency to flow unless restrained by harder metal and this is the function of the ribs 16 and 17. These are preferably made very narrow in order that the area of soft metal in contact with the other member contacting therewith will be as great as possible and still maintain the advantages derived from the use of the ribs. Tin is preferably used, but as its melting point is rather low, approximately 442° F., it will be desirable to use an alloy with a higher melting point when the packing is to be used in connection with bearings working at higher temperatures, for examples in machines using superheated steam. If desired, the packing ring need not carry the inserts of soft metal but may have its friction bearing surface highly polished, the soft metal being carried by the member with which the packing ring cooperates.

As indicated in the preceding paragraph the member cooperating with the packing ring may carry the soft metal. This construction is shown in Figs. 2 and 4 in which a member 19 has a friction bearing surface to contact with the packing ring, this member having pockets in its bearing face resulting from the formation of the ribs 16 and 17 thereon. These ribs entirely enclose the spaces in which the soft metal is placed. By reason of its being entirely enclosed, the soft metal is prevented from flowing, either from frictional contact or from pressure. The surface shown in Fig. 1 may be used where the pressure of the thrust is low, while that shown in Fig. 2 is intended for use with high pressure. As indicated above, either of the two contacting members may carry the inserts of soft metal and the other surface be polished. Certain of my prior constructions are disclosed in my patents numbered 1,583,931 and 1,607,350 and dated respectively, May 11, 1926, and November 16, 1926, and other constructions are disclosed in copending applications but a disclosure of the subject matter thereof is not necessary to an understanding of the present invention and is therefore not included in this application.

In Patent No. 1,583,931 the friction surfaces are largely composed of soft metal contacting polished metal. When tin is used as the soft metal in contact with polished steel it improves the steel surface, lessening the initial friction and therefore the wear of the parts. In some cases this polishing of the hard metal is expensive and it is therefore desirable to avoid as much of this as possible. In accordance with the present invention, the amount of polishing required is reduced to a minimum, thus reducing the cost of manufacture. While, in accordance with my inventions referred to above, it was necessary that large areas or a major part be polished, it will be evident from the foregoing, that, in accordance with the present invention, only a small area or minor part need be polished.

The construction shown in Figs. 5 and 6 is intended for use in a structure of the character indicated in Fig. 9. In this construction, a pressure ring 20, formed with slots 21, is provided for the holding of a packing member in proper position, resiliently. It will of course be understood that this ring may also be constructed with the slots 21 extending radially thru the inner circumference instead of the outer circumference as shown in Figs. 5 and 6, and the flange along the outer circumference. This ring 20 is made of resilient metal and may be used either to put a sealing pressure upon the radial flange of the packing ring or to hold the radial flange thereof in contact in the assembly, or for both purposes. Thin radial flanges such as shown on the packing ring 18 are inclined to warp and, in some instances, pressure rings 20 or other means are necessary to hold the flanges in contact.

In the centrifugal oil pump, a portion of which is shown in Fig. 7, the housing 23 contains the rotor 22 with its bearing 24. In this construction the packing ring 18 is mounted on the rotor 22 with a force fit. At its inner end, it abuts against the inner race of the bearing 24. The inner circumference of the packing ring 18 may be coated with soft metal as an aid in sealing the stationary joint. In this particular, the construction disclosed herein is somewhat similar to that of one of my co-pending applications. In the present construction, the helical spring 26 is seated upon the outer race of the bearing 24 and exerts pressure upon the radial flange of the packing ring 18, forcing it into sealing contact with the annular friction surface of the part 28 (see Fig. 7). The spring 26 and the oil within the pump both exert pressure upon the flange of the ring 18 in order that the pressure between the sealing surfaces of the ring and the part 28 will be greater than the oil pressure, thereby insuring a perfect seal. The outer diameter of the ring 18 is smaller than the bore of the housing in order that the rotor may have a slight eccentric movement. Spanner holes 25 are provided in part 28 so that this may be screwed into the housing 23 against the lead sealing ring 27, thereby producing a tight joint at this point.

The constructions shown in Figs. 9, 10 and 11 are provided with an opening 45 thru which lubricant may be furnished to keep the bearing lubricated and maintain the lubricant under pressure. One construction of the lubricant pressure reservoir is shown in Fig. 8. This construction is similar to one disclosed in a copending application recently filed by me. In this construction, a casing 30 has a reservoir 29 therein and is provided at its outlet end with a screw-threaded projection 31 apertured at 32 for the passage of the lubricant. The projection or nipple 31 engages the screw-threaded opening 45 and is tightly screwed into the same to prevent any leakage of lubricant at this point. A screw-threaded head 33 engages corresponding screw threads in the end of the casing 30 and has a substantially centrally located aperture therein for the reception of the longitudinally apertured plunger stem 34 carrying at its inner end a head 36 which is pressed against the shoulder 35 by means of the nut 38. A packing ring 37 surrounds the stem 34 between the head 36 and the nut 38 and is provided with a cylindrical flange which contacts with the internal wall of the casing 30. Within the casing 30, surrounding the stem 34 and separated from each other by means of a stirrup 40 are two helical springs 39 and 41 which are adapted to react against the head 33 and the plunger 36 to maintain pressure upon the lubricant in the reservoir 29. The stem 34 projecting thru cap 33 carries the valve 43 at its upper end in a position to close the passage 42 through the stem against outward flow of lubricant. This valve is constructed and arranged to permit lubricant to enter the reservoir 29 from a pump or gun attached to the threads 44, as will be readily understood. The quantity of lubricant within the reservoir 29 may be judged by the length of stem 34 projecting above the head 33. If desired, more springs and stirrups may be added to increase the amount of available space in the casing 30 for the reception of lubricant. The addition of the extra spring or springs is important in that it enables a more uniform pressure to be maintained upon the lubricant. Of course the same effect can be produced by using a single long spring and lengthening the casing 30, but this would make the device cumbersome.

As shown in Fig. 9, the housing 23$^b$ of a centrifugal pump contains the rotor 22 and the bearing members which serve to position the rotor in the housing and to reduce the friction of rotation to a minimum. The inner race of the radial bearing 48 is mounted upon the packing rings 18, as shown, the packing rings having a force fit on the rotor 22. These packing rings abut at the middle of the race. The rings 49 and 50 are spaced by the outer race of the bearing and provide annular contact for the packing rings 18. The pressure rings 20, referred to above, act between the inner bearing race and the radial flanges of the rings 18, pressing said flanges into contact with the rings 49 and 50. The outer diameter of the rings 18 is smaller than the internal diameter of the tubular portion of rings 49 and 50, to permit eccentric movement of the rotor. The pipe 47 shown in Figs. 9 to 11 has a drive fit in the housing 23 and projects into a hole in the ring 49, thus keeping said ring in position. The packing parts are held against the shoulder 23$^a$ of the housing 23 by means of the ring 46 threaded into the housing, as described above. Thrust of the rotor will be exerted against the annular surface 51, as will be evident.

Lubricant under pressure from a suitable pressure device, such as shown in Fig. 8, passes thru the pipe 47 and fills all spaces between the radial flanges of the packing rings 18 and exerts sealing pressure on the rings at both their stationary and moving joints. The lubricant pressure plus the pressure of the rings 20 and the lubricant pressure plus pressure of the force fit exceeds the pressure of the fluid within the machine, thus insuring a perfect seal at both the moving and stationary joints of the packing ring. The packing rings may be coated with soft metal except upon their friction bearing surfaces to insure a perfect seal at the stationary joint, to prevent attack of the ring by the fluid within the machine and to minimize electrolytic action, as set forth in one of my prior applications referred to above. It is understood that this packing, as disclosed in Fig. 9, may be adapted to any rotating member requiring a radial bearing, whether such bearing be of the ball, roller, solid, or any other type.

In the main, the construction of Fig. 9, described in the preceding paragraphs, and that of Fig. 10, are similar. In Fig. 10 the housing 23$^c$ also contains the rotor 22. The inner race of the radial and thrust bearing 53 is mounted upon the inner packing ring 18, the latter being a force fit upon the rotor 22 and set against the ring 52. The outer race of the bearing is mounted within the outer packing ring 18, the latter being a force fit within the housing 23$^c$ and seating against the ring 49. The rings 49 and 52 are spaced by the bearing and provide annular contact for the packing rings 18. Pressure rings 20 may be used in this bearing, if desired, for the purpose and function explained above. The diameters of the packing rings 18 are so related to the diameters of the rings 49 and 52 as to allow eccentric movement of the rotor. It is understood that this packing may be adapted to any rotating member requiring a radial and thrust bearing, whatever may be the type of such bearing.

The construction of Fig. 11 is similar to that of Fig. 10 and the parts function in the same manner except that the housing 23$^d$, instead of the ring 46, takes the bearing thrust.

While I have shown and described certain specific embodiments of my invention, it is of course understood that the specific description of structure set forth above may be departed from without departing from the spirit of my invention as set forth in this specification and the appended claims.

Having now described my invention, I claim:

1. A packing member, said member having an annular sealing surface adapted to contact a polished, relatively movable part, said sealing surface consisting of large segments of tin between narrow radial bands of harder metal which extend entirely across the annular surface.

2. In a packing between relatively movable parts of a machine, the combination of two metal members having annular sealing friction surfaces in contact, means for holding said members in position and means for maintaining sealing pressure between the members, one member having a polished sealing friction surface and the other member having a sealing friction surface consisting primarily of soft metal and secondarily of narrow bands of harder metal extending substantially to the surface plane of said soft metal to prevent flow of the soft metal under working conditions.

In witness whereof, I hereunto subscribe my name to this specification.

BRYAN P. JOYCE.